United States Patent [19]

Crivello

[11] 4,319,974
[45] Mar. 16, 1982

[54] UV CURABLE COMPOSITIONS AND SUBSTRATES TREATED THEREWITH

[75] Inventor: James V. Crivello, Clifton Park, N.Y.

[73] Assignee: General Electric Company, Schenectady, N.Y.

[21] Appl. No.: 142,100

[22] Filed: Apr. 21, 1980

[51] Int. Cl.$^3$ ............................................. C08G 65/10
[52] U.S. Cl. ............................... 204/159.11; 525/507; 528/89; 528/90; 528/91; 528/92; 528/361; 528/408; 528/409; 528/410; 528/412; 528/416
[58] Field of Search ........................ 528/89, 90, 91, 92, 528/408, 409, 410, 411, 412, 416, 361; 525/507; 204/159.11

[56] References Cited

U.S. PATENT DOCUMENTS

| | | | |
|---|---|---|---|
| 3,981,897 | 9/1976 | Crivello | 260/440 |
| 4,058,401 | 11/1977 | Crivello | 96/115 R |
| 4,159,975 | 7/1979 | Praetorius et al. | 525/91 |
| 4,161,405 | 6/1979 | Crivello | 96/35.1 |
| 4,173,476 | 11/1979 | Smith et al. | 430/280 |
| 4,173,551 | 11/1979 | Crivello | 260/18 EP |
| 4,230,814 | 10/1980 | Crivello | 526/333 |

*Primary Examiner*—Earl A. Nielsen
*Attorney, Agent, or Firm*—William A. Teoli; James C. Davis, Jr.

[57] ABSTRACT

UV curable mixtures of $C_{(8-28)}$ α-olefin oxides and certain onium salt photoinitiators, for example, certain diaryliodonium salts, or triarylsulfonium salts, and optionally polyfunctional epoxy resin, have been found useful in paper release coating applications.

4 Claims, No Drawings

UV CURABLE COMPOSITIONS AND SUBSTRATES TREATED THEREWITH

BACKGROUND OF THE INVENTION

The present invention relates to UV curable compositions based on the use of $C_{(8-28)}$ α-olefin oxide and certain aryl onium salts. More particularly, the present invention relates to paper products treated with a non-transferable paper release coating useful in pressure sensitive adhesive applications.

Prior to the present invention, paper release compositions were often based on the use of heat cured platinum catalyzed organo polysiloxane compositions, as shown for example by Takamizawa et al., U.S. Pat. No. 4,057,596, or an organic solvent containing silicone mixture utilizing a tetra-alkyl titanate curing agent, as taught by Doss et al., U.S. Pat. No. 4,151,344. Although silicones often provide valuable adhesive surfaces on various substrates with excellent mechanical properties, silicones are frequently economically less attractive then the more readily available organics. However, organic coatings in many instances do not possess low enough surface energy to provide good release properties, as shown by a tendency to rub off and to migrate to the surface of the adhesive, as compared to silicone release coatings.

The present invention is based on the discovery that UV curable compositions of $C_{(8-28)}$ α-olefin oxides, which optionally can be utilized with polyfunctional epoxides, will provide superior UV curable paper coating compositions when used with an effective amount of an aryl onium salt of the formula, $$[Y]^+[MQ_n]^-,$$

where Y is a member selected from

[(R)$_a$ (R$^1$)$_b$ I] and

[(R)$_c$ (R$^2$)$_d$ (R$^3$)$_e$ S],

R is a monovalent $C_{(6-13)}$ aromatic organic radical, R$^1$ is a divalent aromatic organic radical, R$^2$ is a monovalent organic aliphatic radical selected from alkyl, cyclo alkyl and substituted alkyl, R$^3$ is a polyvalent aromatic organic radical forming a heterocyclic or fused ring structure, M is a metal or metalloid, Q is a halogen radical, a is a whole number equal to 0 or 2, b is a whole number equal to 0 to 1 and the sum of a+b is equal to 1 or 2, c is a whole number equal to 0 to 3 inclusive, d is a whole number equal to 0 to 2 inclusive, e is a whole number equal to 0 or 1, and the sum of c, d, and e is equal to 1 to 3 inclusive, and n is an integer equal to 4-6 inclusive.

Statement of the Invention

There is provided by the present invention, curable compositions comprising by weight
 (A) 15 to 100% of a $C_{(8-28)}$ α-olefin oxide,
 (B) 0 to 85% of a polyfunctional epoxy resin,
 (C) 0.1 to 10%, based on the sum of the weight of (A), (B) and (C) of an aryl onium salt of formula (1).

A further aspect of the present invention is directed to a paper substrate having at least a major portion of its surface treated with a cured mixture of 100 to 19% by weight of a $C_{(8-28)}$ α-olefin oxide and correspondingly from 0 to 81% by weight of a polyfunctional epoxy resin.

There is further provided by the present invention, a composite structure of a pressure sensitive adhesive tape or label in contact with a paper substrate treated with a paper release coating comprising a cured mixture of 100 to 19% by weight of a $C_{(8-28)}$ α-olefin oxide, 0 to 18% by weight of a polyfunctional epoxy resin.

Radicals included by R can be the same or different, aromatic carbocyclic or heterocyclic radicals having from 6 to 20 carbon atoms, which can be substituted with from 1 to 4 monovalent radicals selected from $C_{(1-8)}$ alkoxy, $C_{(1-20)}$ alkyl, nitro, chloro, etc., R is more particularly phenyl, chlorophenyl, nitrophenyl, methoxyphenyl, pyridyl, etc. There are included by R$^1$, divalent radicals, such as

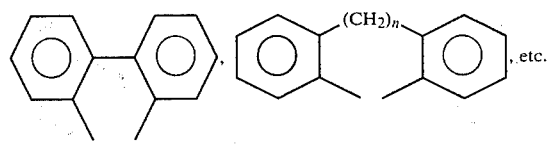

Radicals which are included by R$^2$ are, for example, $C_{(1-20)}$ alkyl, such as methyl, ethyl, etc., substituted alkyl, such as —C$_2$H$_4$OCH$_3$, —CH$_2$COOC$_2$H$_5$, —CH$_2$COCH$_3$, etc. There are included by R$^3$ such structures as

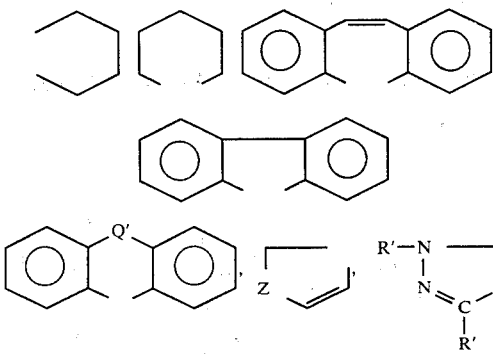

where Q' is selected from O, CH$_2$, N—R' and S, Z is selected from —O—, —S— and

and R' is monovalent radical selected from hydrogen and $C_{(1-10)}$ hydrocarbon Metal or metalloids included by M of formula (1) are Sb, Sn, Bi, Al, Ga, In, transition metals such as Fe, Ti, Zr, Sc, V, Cr, Mn, rare earth elements such as the lanthanides, for example, Pr, Nd, etc., actinides, such as Th, Ta, U, Np, etc., and metalloids such as B, P, As, etc. Complex anions included by $MQ_d^{-(d-e)}$ are, for example, BF$_4^-$, PF$_6^-$, AsF$_6^-$, SbF$_6^-$, FeCl$_4^-$, SnCl$_6^-$, SbCl$_6^-$, BiCl$_5^=$, etc.

Halonium salts included by formula (1) are, for example,

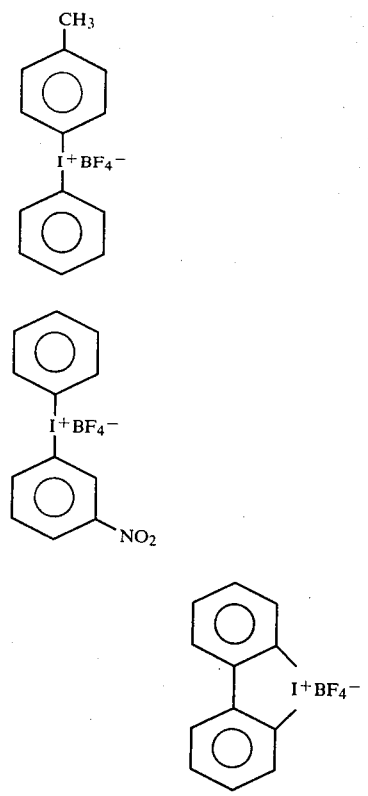

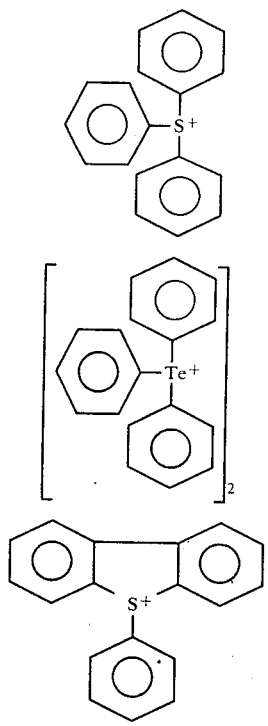

Group VIa sulfonium salts included by formula (1) are, for example,

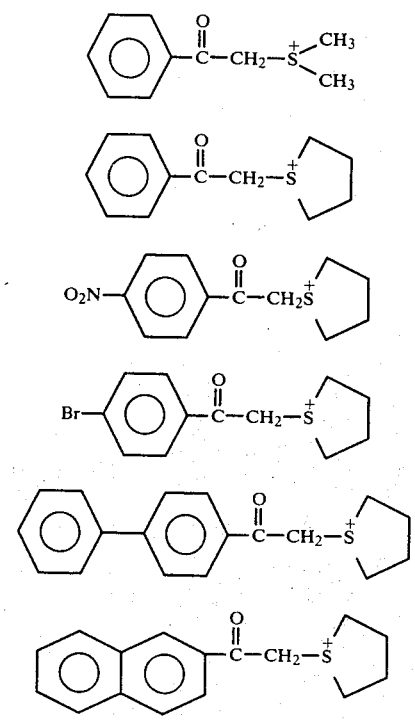

The onium salts of formula (1) can be made by different methods. One procedure for making the iodonium salts is by effecting contact under aqueous conditions between an aryliodonium bisulfate and the corresponding hexafluoro acid or salt, such as $Y^1MF_6$, where $Y^1$ can be hydrogen, an alkali metal ion, alkaline earth metal ion or transition metal ion.

In addition to the above-described metathesis for making the corresponding iodonium salts, the iodonium salts of the present invention, also can be prepared by using silver compounds, such as silver oxide, or silver tetrafluoroborate, which were reacted with the appropriate diaryliodonium salt, as shown by M. C. Caserio et al., J. Am. Chem. Soc. 81, 336 (1959) or M. C. Beringer et al., J. Am. Chem. Soc., 81, 342 (1959). Methods for making Group VIa compounds, such as sulfonium, selenium and tellurium compounds can be made by procedures shown in J. W. Knapczyk and W. E. McEwen, J. Am. Chem. Soc., 91 145, (1969); A. L. Maycock and G. A. Berchtold, J. Org. Chem., 35 No. 8, 2532 (1970); H. M. Pitt, U.S. Pat. No. 2,807,648, E. Goethals and P. De Radzetzky, Bul. Soc. Chim. Belg., 73 546 (1964); H. M. Leichester and F. W. Bergstrom, J. Am. Chem. Soc., 51 3587 (1929), etc.

The term "epoxy resin" as utilized in the description of the curable compositions of the present invention, includes any monomeric, dimeric or oligomeric or polymeric polyfunctional epoxy material. For example, those resins which result from the reaction of bisphenol-A (4,4'-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 80 632-5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of polymer science and technology, Vol. 6, 1967, Interscience Publishers, New York, pp 209-271.

Included by the α-olefin oxides which can be employed in the practice of the present invention are, for example,

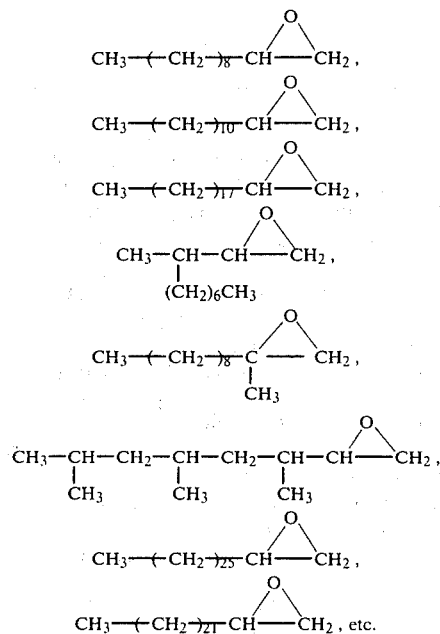

In the practice of the present invention, the UV curable mixtures can be made by merely blending together the α-olefin oxide with an effective amount of the aryl onium salt. In certain instances, it may be desirable to employ an organic solvent to facilitate the incorporation of the aryl onium salt into the α-olefin oxide. Suitable organic solvents which can be used are, for example, ethanol, methanol, acetone acetonitrile, chloroform, methylene chloride, chlorobenzene, etc.

It has been found that improved adhesion is achieved if a polyfunctional epoxide is incorporated in the aforedescribed mixture in amounts which are previously defined. The order of addition of the various ingredients, however, is not critical and in certain instances it may be desirable to initially combine the aryl onium salt with the polyfunctional epoxide prior to the employment of the α-olefin oxide.

The UV curable compositions of the present invention can have a viscosity in the range of from 50 centipoises to 10,000 centipoises, based on the ingredients utilized in the mixture and the particular application to which the UV curable mixture is employed. The application of the UV curable mixture onto a suitable substrate can be achieved by various techniques, such as by the use of a curtain coater, spray, brush, etc. A coating of from 0.01 to 1 mils will provide for effective results, while preferably a thickness of 0.05 to 0.1 mils is preferred. Cure times in the range of from 0.1 seconds up to 2 minutes will provide satisfactory adherent abhesive coatings, depending on such factors as the nature of the aryl onium salt, the intensity of the UV light utilized, etc.

Typical of the substrates to which the compositions of the present invention can be applied are, for example, glass, vegetable parchments, craft paper, metal foils, plastic films, such as cellophane, polyethylene, polypropylene, vinyl resins, acrylic resins, polyamide resins and polyester resins.

The amount of the UV curable mixture which can be applied to the above-described substrates can vary widely, depending upon the nature of the paper and the intended application. Experience has shown that a proportion of from about 0.1 to about 1 pound of UV curable mixture per ream of paper (3,000 sq. ft.) coated on one side will provide for effective results. Typical of the applications to which the coated paper substrates of the present invention can be utilized are, for example, release substrates for pressure sensitive adhesives, packaging material for metallic, wooden or plastic parts, prefabricated paper or cardboard, labels, decals, nameplates, hangers, fasteners, etc.

In order that those skilled in the art will be better able to practice the invention, the following examples are given by way of illustration and not by way of limitation. All parts are by weight.

EXAMPLE 1

A 2% solution of 4,4'-di-t-butyldiphenyliodonium hexafluoroantimonate in Vikalox 11-14, a mixture of $C_{(11-14)}$ α-olefin oxides of the Viking Chemical Company, was applied with a glass rod onto white bond paper to a thickness of 0.1 mil. The coated paper was then irradiated using a GE H3T7 medium pressure mercury arc lamp mounted at a distance of 4 inches from the paper. After an exposure time of 5 seconds, a tack-free coating was obtained. Various pressure sensitive labels and Scotch brand adhesive tapes were contacted to the adhesive surface of the treated paper. It was found that although the labels and the tape adhered to the surface of the paper upon contact, that the labels and the adhesive tapes cleanly released without any detectable change shown on the surface of the treated paper.

EXAMPLE 2

The procedure of Example 1 was repeated, except that there was added to the UV curable mixture 10% by weight of the resulting mixture of 3,4-epoxycyclohexylmethyl-3',4'-epoxycyclohexane carboxylate. A tack-free adhesive film was also obtained after an initial 5 second cure of the applied curable composition. Portions of the treated paper were then covered with pressure sensitive adhesive labels and adhesive tape and Scotch brand adhesive tape. The resulting composite was then allowed to rest under ambient conditions for 24 hours. It was found that both the pressure sensitive adhesive labels and the Scotch brand tape readily released from the surface of the paper and did not show any change in adhesive characteristics when applied to an untreated paper substrate as a result of being in contact with the cured composition of the present invention. No migration occurred of the cured resin from the surface of the paper to the adhesive on the tape and label which would affect the adhesive characteristics of both the pressure sensitive adhesive labels and the Scotch brand tape.

EXAMPLE 3

A mixture of 79% by weight of limonene dioxide, 19% of Vikalox 11-14 and 2% by weight of a diaryliodonium hexafluoroantimonate salt having the formula,

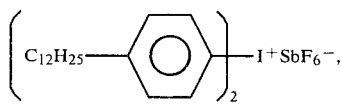

was applied as a film onto white bond paper in accordance with the procedure of Example 1. The paper was irradiated for 10 seconds using a GE H3T7 mercury arc lamp. After irradiation, the paper was tested for its release properties, after it was determined it was tack-free. The coating was found to exhibit non-rub off, based on the use of a paper towel soaked in acetone which was rubbed onto the surface of the treated paper in a circulatory manner for 10 seconds. The coating was found to be substantially free of migration as the result of applying Scotch brand tape onto its surface for a period of 24 hours and then pulling off the tape and finding its adhesive characteristics substantially unchanged when applied to a non-treated paper substrate.

EXAMPLE 4

A mixture of 79% by weight of epoxy resin of Example 2, 19% by weight of hexadecene-1,2-oxide and 2% by weight of a diaryliodonium hexafluoroantimonate salt of the formula,

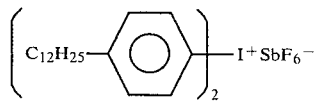

was applied onto the surface of a polyethylene laminated craft paper to a thickness of 0.01 mil and cured as previously described in Example 3. There was obtained a non-tacky cured film after 5 seconds irradiation. The film was peel resistant and exhibited release properties when contacted with Scotch tape under moderate pressure which was then pulled freely from the surface of the treated substrate without any evidence of adhesive separation.

The same procedure was repeated, except that there is utilized 89% of the 3,4-epoxycyclohexylmethyl-3',4'-epoxycyclohexane carboxylate, 9% of the hexadecene-1,2-oxide and 2% of the above shown diaryliodonium salt. It is found that the resulting cured film, although tack-free to manual touch, shows adhesive separation when Scotch tape is applied onto the surface of the treated paper and then separated therefrom. In addition, the adhesive performance of the resulting Scotch tape is substantially reduced showing evidence of migration.

EXAMPLE 5

Additional mixtures were prepared consisting of equal parts by weight of the CY179 epoxy resin of Example 4, manufactured by the Ciba Geigy Company and $C_{15}$-$C_{18}$ α-olefin oxide. There was added various portions of the aforementioned mixture 2% by weight of different photoinitiators dissolved in a small amount of ethanol. The mixtures were coated onto white bond paper to a thickness of approximately 0.1 mil and cured by passing the coatings under a GE H3T7 medium pressure mercury arc lamp. Cure times shown below indicate that the resulting coating could not be manually rubbed off when Scotch brand tape was applied to the treated paper surface having the cured coating, the tape could be readily removed from the coating without any evidence of adhesive separation and interference with the subsequent performance of the adhesive tape resulting from resin migration.

| Photoinitiator | Cure Time (sec) |
|---|---|
| $(C_6H_5)_2I^+AsF_6^-$ | 5 |
| $(C_6H_5)_3S^+SbF_6^-$ | 5 |
| 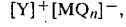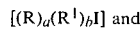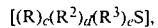 | 3 |

The above results show that the UV curable compositions of the present invention can be applied onto a paper substrate and cured to a tack-free adhesive coating which can be employed as a protective covering for pressure sensitive adhesive labels and for adhesive tapes.

Although the above examples are directed to only a few of the very many variables of the present invention, it should be understood that the present invention is directed to a much broader variety of mixtures resulting from the use of α-olefin oxides, optionally epoxy resins as previously defined which are employed in further combination with an effective amount of a photoinitiator, as shown by formula (1).

What I claim as new and desire to secure by letters patent of the United States is:

1. Curable or polymerizable compositions comprising by weight
   (A) 15 to 100% of a $C_{(8-12)}$ α-olefin oxide,
   (B) 0 to 85% of a polyfunctional epoxy resin,
   (C) 0.1 to 10% based on the sum of the weight (A), (B) and (C) of an aryl onium salt of the formula, $[Y]^+[MQ_n]^-$, where Y is a member selected from $[(R)_a(R^1)_bI]$ and $[(R)_c(R^2)_d(R^3)_eS]$, where R is a monovalent aromatic organic radical, $R^1$ is a divalent aromatic organic radical, $R^2$ is a monovalent organic aliphatic radical selected from alkyl, cyano alkyl and substituted alkyl, $R^3$ is a polyvalent organic radical forming a heterocyclic or fused ring structure, M is a metal or metalloid, Q is a halogen radical, a is a whole number equal to 0 or 2, b is a whole number equal to 0 or 1, and the sum of a+b is equal to 1 or 2, c is a whole number equal to 0 to 3 inclusive, d is a whole number equal to 0 to 2 inclusive, e is a whole number equal to 0 or 1, and the sum of c, d and e is equal to 1 to 3 inclusive, and n is an integer equal to 4–6 inclusive.

2. A curable composition in accordance with claim 1, where the $C_{(8-28)}$ α-olefin oxide is 1,2-epoxydodecene.

3. A curable mixture in accordance with claim 1, where the epoxy resin is 3,4-epoxycyclohexylmethyl-3′,4′-epoxycyclohexane carboxylate.

4. A curable composition in accordance with claim 1, where the aryl onium salt is 4,4′-di-t-butyl diphenyliodonium hexafluoroantimonate.

* * * * *